(12) United States Patent
Singh (10) Patent No.: US 11,282,615 B2
(45) Date of Patent: Mar. 22, 2022

(54) SPENT NUCLEAR FUEL CASK WITH DOSE ATTENUATION DEVICES

(71) Applicant: HOLTEC INTERNATIONAL, Camden, NJ (US)

(72) Inventor: Krishna P. Singh, Hobe Sound, FL (US)

(73) Assignee: HOLTEC INTERNATIONAL

( * ) Notice: Subject to any disclaimer, the term of this patent is extended or adjusted under 35 U.S.C. 154(b) by 203 days.

(21) Appl. No.: 16/407,992

(22) Filed: May 9, 2019

(65) Prior Publication Data

US 2020/0027609 A1 Jan. 23, 2020

Related U.S. Application Data

(60) Provisional application No. 62/669,665, filed on May 10, 2018.

(51) Int. Cl.
*G21F 5/012* (2006.01)
*G21C 19/07* (2006.01)

(52) U.S. Cl.
CPC ............. *G21F 5/012* (2013.01); *G21C 19/07* (2013.01)

(58) Field of Classification Search
CPC . G21F 5/012; G21F 5/008; G21F 5/02; G21F 5/12
See application file for complete search history.

(56) References Cited

U.S. PATENT DOCUMENTS

| | | | | |
|---|---|---|---|---|
| 4,457,888 | A | * 7/1984 | Vickrey, Jr. | ............ G21C 19/07 376/272 |
| 4,543,488 | A | * 9/1985 | Diem | ..................... G21C 19/07 250/507.1 |
| 4,800,283 | A | 1/1989 | Efferding | |
| 5,898,747 | A | 4/1999 | Singh | |

(Continued)

FOREIGN PATENT DOCUMENTS

EP 0107889 5/1984

OTHER PUBLICATIONS

International Search Report and Written Opinion for International Application No. PCT/US2019-031594 dated Jul. 23, 2019.

*Primary Examiner* — Jack W Keith
*Assistant Examiner* — Joshua C Devorkin
(74) *Attorney, Agent, or Firm* — The Belles Group, P.C.

(57) ABSTRACT

A storage apparatus with radiation shielding for spent nuclear fuel includes a fuel basket comprising elongated fuel storage tubes each defining an open cell configured to hold a nuclear fuel assembly. Gamma radiation attenuation inserts are nested inside at least some of the storage tubes. The inserts each comprise elongated open-ended tubular bodies which may have a rectangular cuboid configuration with square cross section. The inserts are composed of a dense metallic material selected for blocking gamma radiation and may have high thermal conductivity for effective heat dissipation from the decaying nuclear fuel. Attenuation inserts can occupy some or all perimeter tubes to provide shielding against gamma radiation emanating in a lateral direction from the fuel basket. The inserts may include upper and lower securement features for detachable fixation to the storage tubes, and air/gas flow cutouts.

17 Claims, 9 Drawing Sheets

(56) References Cited

U.S. PATENT DOCUMENTS

| | | | |
|---|---|---|---|
| 6,442,227 B1* | 8/2002 | Iacovino, Jr. | G21C 19/07 |
| | | | 376/272 |
| 8,548,112 B2 | 10/2013 | Singh et al. | |
| 8,929,504 B2 | 1/2015 | Singh et al. | |
| 9,685,248 B2 | 6/2017 | Agace et al. | |
| 2011/0142189 A1* | 6/2011 | Foussard | G21C 19/07 |
| | | | 376/272 |
| 2011/0255647 A1* | 10/2011 | Singh | G21F 5/005 |
| | | | 376/272 |
| 2011/0286567 A1* | 11/2011 | Singh | G21C 19/06 |
| | | | 376/272 |
| 2013/0129043 A1 | 5/2013 | Morton et al. | |
| 2013/0343503 A1* | 12/2013 | Agace | G21C 19/40 |
| | | | 376/272 |
| 2017/0316843 A1 | 11/2017 | Agace et al. | |
| 2017/0372806 A1* | 12/2017 | Singh | G21C 19/40 |
| 2018/0122527 A1 | 5/2018 | Singh et al. | |

* cited by examiner

SPENT NUCLEAR FUEL CASK WITH DOSE ATTENUATION DEVICES

CROSS-REFERENCE TO RELATED APPLICATIONS

This application claims the benefit of U.S. Provisional Application No. 62/669,665 filed May 10, 2018, which is incorporated herein by reference in its entirety.

BACKGROUND

The present invention relates generally to casks used to transport and store spent nuclear fuel created by nuclear generating plants or other facilities, and more particularly to such casks which incorporate a radiation does attenuation device.

In the operation of nuclear reactors, the nuclear energy source is in the form of hollow zircaloy tubes filled with enriched uranium, collectively arranged in assemblages referred to as fuel assemblies. When the energy in the fuel assembly has been depleted to a certain predetermined level, the fuel assembly is removed from the nuclear reactor. The standard structure used to package used or spent fuel assemblies discharged from light water reactors for off-site shipment or on-site dry storage is known as the fuel basket. The fuel basket is essentially an assemblage of prismatic storage cells each of which is sized to store one fuel assembly that comprises a plurality of individual spent nuclear fuel rods. The fuel basket is arranged inside a metallic storage canister which is placed into a ventilated outer overpack or cask for safe transport or storage of the multiple spent fuel assemblies within the inner fuel basket. Such outer casks are generally constructed to provide enhanced radiation shielding including metallic inner and outer cylindrical walls with a concrete mass or liner disposed therebetween for radiation shielding.

The spent nuclear fuel ("SNF") in the fuel assemblies is still highly radioactive and produces considerable heat which must be dissipated, in addition to concomitantly emitting dangerous ionizing neutron and gamma photons (i.e. neutron and gamma radiation) requiring protective shielding. Thus, great caution must be exercised when the fuel assemblies are handled, transported, packaged and stored. Neutron radiation may be effectively attenuated with metallic and polymeric shielding materials containing boron which may be incorporated into the storage cells of the spent nuclear fuel baskets. These boron-containing materials however are not effective at attenuating and shielding gamma radiation emitted from the fuel baskets. Effective gamma radiation shielding requires very dense materials, such as lead or others. Heretofore, spent nuclear fuel baskets have not addressed the issue of gamma radiation shielding.

The fuel assembly storage canister held inside the outer cask provides an opportunity to enhance gamma radiation shielding. The cross sectional opening of the fuel basket storage cell, each of which hold a single spent fuel assembly, is typically at least 6 mm, and sometimes as large as 10 mm greater than the fuel assembly's square cross section to facilitate its insertion and removal into the reactor and eventual placement in the fuel basket storage cell taking into account the bow and camber that some fuel assemblies may suffer and develop during their irradiation in the reactor. Some peripheral clearance in the storage cell is also typically required to accommodate a damaged fuel assembly that has been physically damaged and is no longer in-tact for normal handling.

A need exists for gamma radiation shielding of spent nuclear fuel canisters which preferably also takes into account the need to effectively dissipate the excessive heat still generated by the decaying nuclear fuel in the canister during transport or storage.

BRIEF SUMMARY

The present application is directed to a storage system for spent nuclear fuel which seeks to exploit the existing fuel assembly to fuel basket storage cell clearances cited above to provide gamma radiation shielding of the spent nuclear fuel canister. A radiation dose attenuation device is provided which is formed of a dense gamma-blocking material having a composition with high density and preferably a high thermal conductivity to effectively dissipate the substantial heat generated by the decaying nuclear fuel. The radiation does attenuation device is configured for insertion into the fuel storage cells of the fuel basket.

The fuel basket is configured to be inserted into the cavity of the fuel storage canister, which may then be placed inside the outer overpacks or casks described above. The fuel basket may be a gridded structure comprising interlocking metallic plates or adjacent tubes which form a plurality of tightly packed and upwardly open prismatic fuel assembly storage cells. Each cell may have a transverse cross-sectional area configured to insert and accommodate no more than a single fuel assembly which has a rectilinear cross section (e.g. square or rectangular). The storage cells may therefore have a corresponding complementary configured rectilinear cross section to the fuel assemblies with a perimetrically extending gap or clearance provided between the fuel assembly and inside surface of walls of each cell. The gap may extend around the entire perimeter of the fuel assembly of each cell in some implementations.

In one embodiment, the radiation dose attenuation device according to the present disclosure may be in the form of a radiation attenuation insert which is configured to occupy the available gap or clearance between the fuel assembly and inner storage cells walls in the fuel basket. The height of the attenuation insert tube may be substantially coextensive with the height of each storage cell in the fuel basket. The attenuation insert may be configured for either permanent fixation in one of spent fuel assembly storage cells, or removable and detachable securement in to the cell via self-locking retention or securement features as further described herein.

The gamma radiation attenuation insert has a tubular body including open top and bottom, and sidewalls extending therebetween. The attenuation insert may be in the form of a thin walled open-ended rectangular cuboid box or tube with corresponding rectilinear square transverse cross-sectional shape. The tubular attenuation insert is configured and dimensioned for slideable insertion into a respective fuel basket storage cell of the canister.

An ideal material for the present tubular radiation attenuation insert preferably is made of a material having the composition and characteristics of high density for effective gamma ray blocking and high thermal conductivity for residual nuclear fuel decay heat dissipation from the fuel basket. Metallic non-boron containing materials with one or both of these characteristics is preferred. Examples of suitable materials include some dense non-ferrous metals and their alloys. A preferred material is copper in one non-limiting embodiment having both desired characteristics. Lightweight metals with lower densities such as aluminum (e.g. densities less than 3 grams/cubic centimeter) are generally not preferred for the present gamma radiation shielding application in a nuclear fuel basket. Suitable materials preferably have a density of at least 7.0 g/cc, more preferably greater than 8.0 g/cc for effective gamma radiation shielding. It bears noting that lead, a common gamma blocking material sometimes used in the heavier outer overpack or cask construction, is generally not suitable for the present fuel basket application due to its relatively poor/low thermal conductivity and extreme density/weight which would unduly add to the overall weight of the canister.

One non-limiting principal objective of the present is to provide absorption or shielding of the gamma radiation emanating outwards to the environment from the fuel basket and canister in the lateral direction via the gamma-blocking radiation attenuation inserts. Because most of the gamma radiation in the lateral direction is from the spent nuclear fuel assemblies located in the outermost peripheral cells of the canister fuel basket, the attenuation inserts in one embodiment may be installed only in those peripheral cells that have a high radiation emission rate in one non-limiting arrangement. In certain embodiments, all of the outermost peripheral fuel assembly storage cells of the fuel basket may include a radiation attenuation insert tube to construct a continuous lateral barrier against gamma ray emissions which encircles the entire circumference or perimeter of the fuel basket. In other embodiments, only some of the peripheral storage cells may include a attenuation insert which contain fuel assemblies emitting unduly high levels of gamma radiation.

Adding the tubular dense radiation attenuation inserts or boxes in the outer peripheral storage cells advantageously has minimal effect on the reactivity of the basket. Advantageously, as noted above, copper's high thermal conductivity, as opposed to the less thermally conductive materials from which the fuel basket storage cells themselves may be formed (e.g. stainless steel, etc.), will ameliorate any loss of the heat dissipation capacity of the fuel basket and effectively reject heat emanating from the decaying nuclear fuel. Copper also has the attributes of high specific gravity and density, which makes it more efficient at gamma radiation attenuation than other possible materials. Heretofore, copper has typically not been used for gamma radiation attenuation in fuel baskets, and is underappreciated for the present gamma blocking application despite its unique combination of gamma radiation attenuation due to its high density and excellent thermal conductivity properties to dissipate heat from the decaying nuclear fuel in the fuel basket. This makes copper ideally suited for the present gamma radiation attenuation inserts for fuel baskets.

As a basic principle in nuclear shielding, the effectiveness of the radiation attenuation insert box-like structure in attenuating the intensity of the accreted radiation from the fuel is underpinned by and corresponds to its proximity to the fuel assembly. The gamma radiation attenuation insert (dose attenuation device) is therefore preferably located between the fuel assembly and interior surfaces of the cell walls or plates. The thickness of the attenuation insert may be selected so that the spent nuclear fuel assembly insertion or withdrawal capability into and from the fuel basket storage cells of the storage canister is not adversely affected.

In one aspect, a storage apparatus with gamma radiation shielding for spent nuclear fuel comprises: a fuel basket comprising a plurality of elongated fuel storage tubes extending along a longitudinal axis, each of the tubes defining a cell configured to hold a nuclear fuel assembly; a plurality of gamma radiation attenuation inserts each one of which is nested inside a respective cell of at least some of the storage tubes of the fuel basket; each radiation attenuation insert comprising a longitudinally elongated tubular body including an open top end, a bottom end, and plurality of sidewalls extending between the ends; wherein the radiation attenuation insert is composed of a dense material operable to block gamma radiation. The inserts may be formed of non-boron containing material, and more particularly copper in one non-limiting embodiment.

In another aspect, a storage apparatus with gamma radiation shielding for spent nuclear fuel comprises: a canister comprising a baseplate and an elongated shell defining an internal cavity; a fuel basket disposed in the internal cavity, the fuel basket comprising a plurality of metal fuel storage tubes extending upwards from the baseplate along a longitudinal axis and each defining a fuel storage cell; a gamma radiation attenuation insert nested inside a first cell of a first tube of the fuel basket; the radiation attenuation insert comprising a longitudinally elongated cuboid body including open top and bottom ends, and a plurality of sidewalls extending between the ends; an upper securement feature of the radiation attenuation insert engaging a top end of the first tube; and an elastically deformable lower securement feature on the radiation attenuation insert engaging a bottom end portion of the first tube and configured to detachably affix the radiation attenuation insert to the first tube; wherein the radiation attenuation insert is composed of a dense material operable to block gamma radiation. The inserts may be formed of non-boron containing material, and more particularly copper in one non-limiting embodiment.

In another aspect, a method for adding gamma radiation shielding to a fuel basket for storing spent nuclear fuel comprises: providing a fuel basket comprising a plurality of longitudinally elongated fuel storage tubes including peripheral outboard tubes arranged perimetrically around the fuel basket and inboard tubes, each of the tubes defining a cell configured to hold a nuclear fuel assembly; positioning a radiation attenuation insert over a selected outboard tube, the radiation attenuation insert including a plurality of elastically deformable locking members each movable laterally between an outward undeflected position and an inward deflected position; the locking members being in the undeflected position; lowering the radiation attenuation insert into the selected outboard tube; engaging the locking members with walls of the selected outboard tube, wherein the locking members are each moved to the deflected position; sliding the radiation attenuation downwards insert along the walls of the selected outboard tube; disengaging the locking members from the walls of the selected outboard tube near a bottom portion of the selected outboard tube, wherein the locking members each return to the undeflected position; and lockingly engaging each locking member with a corresponding locking edge formed on the bottom portion of the selected tube which resists axial withdrawal of the radiation attenuation insert from the selected outboard tube.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein like elements are labeled similarly and in which.

All drawings are schematic and not necessarily to scale. Features shown numbered in certain figures are the same features which may appear un-numbered in other figures unless noted otherwise herein.

DETAILED DESCRIPTION

The features and benefits of the invention are illustrated and described herein by reference to exemplary embodiments. This description of exemplary embodiments is intended to be read in connection with the accompanying drawings, which are to be considered part of the entire written description. Accordingly, the disclosure expressly should not be limited to such exemplary embodiments illustrating some possible non-limiting combination of features that may exist alone or in other combinations of features.

In the description of embodiments disclosed herein, any reference to direction or orientation is merely intended for convenience of description and is not intended in any way to limit the scope of the present invention. Relative terms such as "lower," "upper," "horizontal," "vertical,", "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise.

As used throughout, any ranges disclosed herein are used as shorthand for describing each and every value that is within the range. Any value within the range can be selected as the terminus of the range. In addition, all references cited herein are hereby incorporated by reference in their entireties. In the event of a conflict in a definition in the present disclosure and that of a cited reference, the present disclosure controls.

Figure 1:
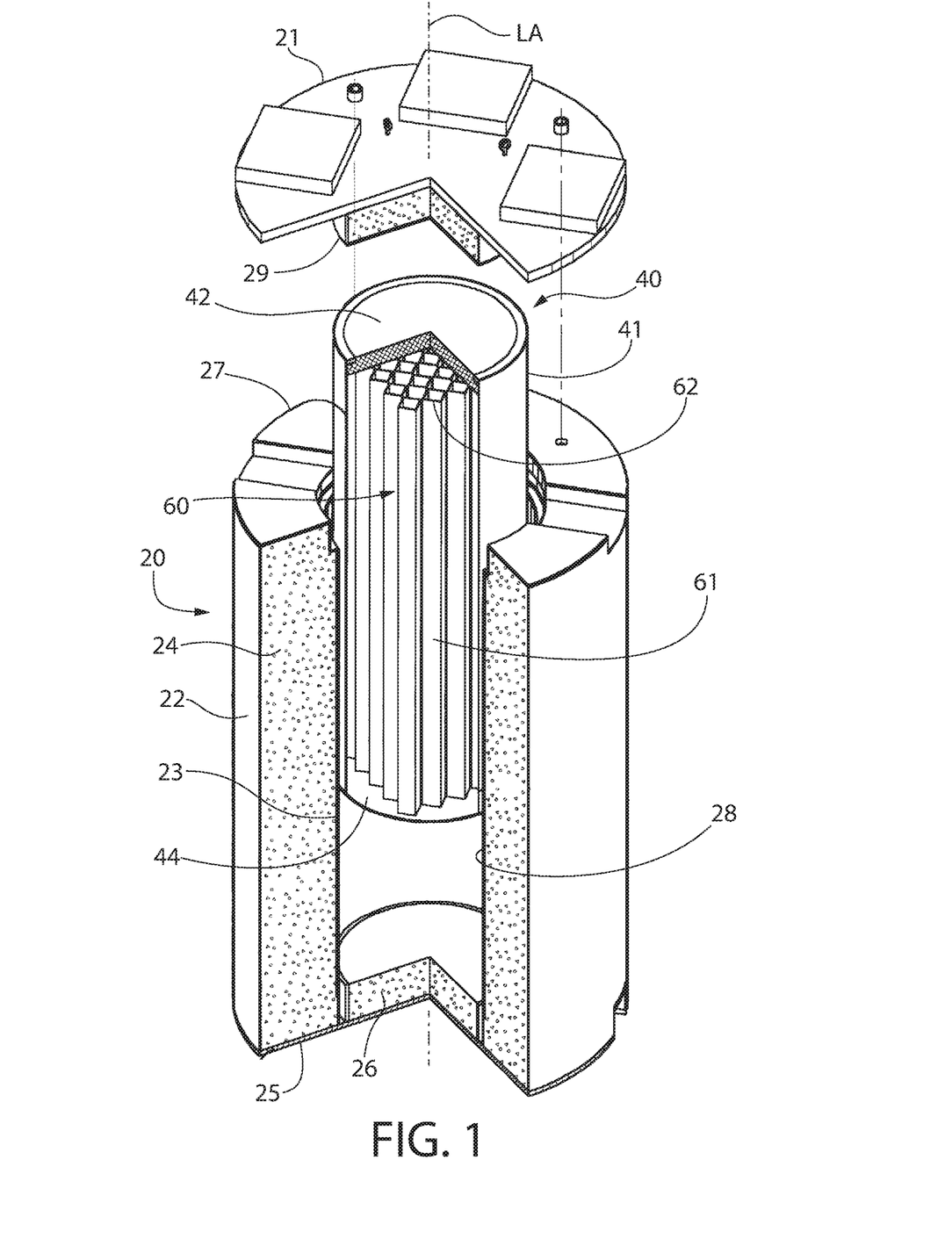
FIG. 1 is a perspective view of a storage system for spent nuclear fuel comprising an outer transport or storage cask and inner fuel storage canister with basket assembly.

FIG. 1 depicts a nuclear fuel storage system with spent fuel assembly storage canister having radiation attenuation inserts (dose attenuation devices) according to the present disclosure. Referring to FIG. 1, the system includes an outer overpack or cask 20 may be a double-walled vessel including cylindrical outer shell 22, inner shell 23, and a concrete mass or liner 24 disposed in an annular space therebetween for radiation blocking. A vertically-extending central cavity 28 of cylindrical configuration extends along a vertical centerline VA defined by the vertically elongated cask body. Cask 20 includes at its bottom end a circular bottom wall 25 which includes a cylindrical concrete base plug 26 having an upward facing top surface exposed to the cavity 28, and an open top end 27. A removable circular lid 21 is coupled to the top end 27 which closes the normally upwardly open cavity 28 when in place. A concrete top plug 29 is secured to the underside of the lid 21. The base plug 26 and top plug 29 provide radiation shielding in the vertical direction, whereas the concrete liner 24 provides radiation shielding in the lateral direction.

Figure 2:
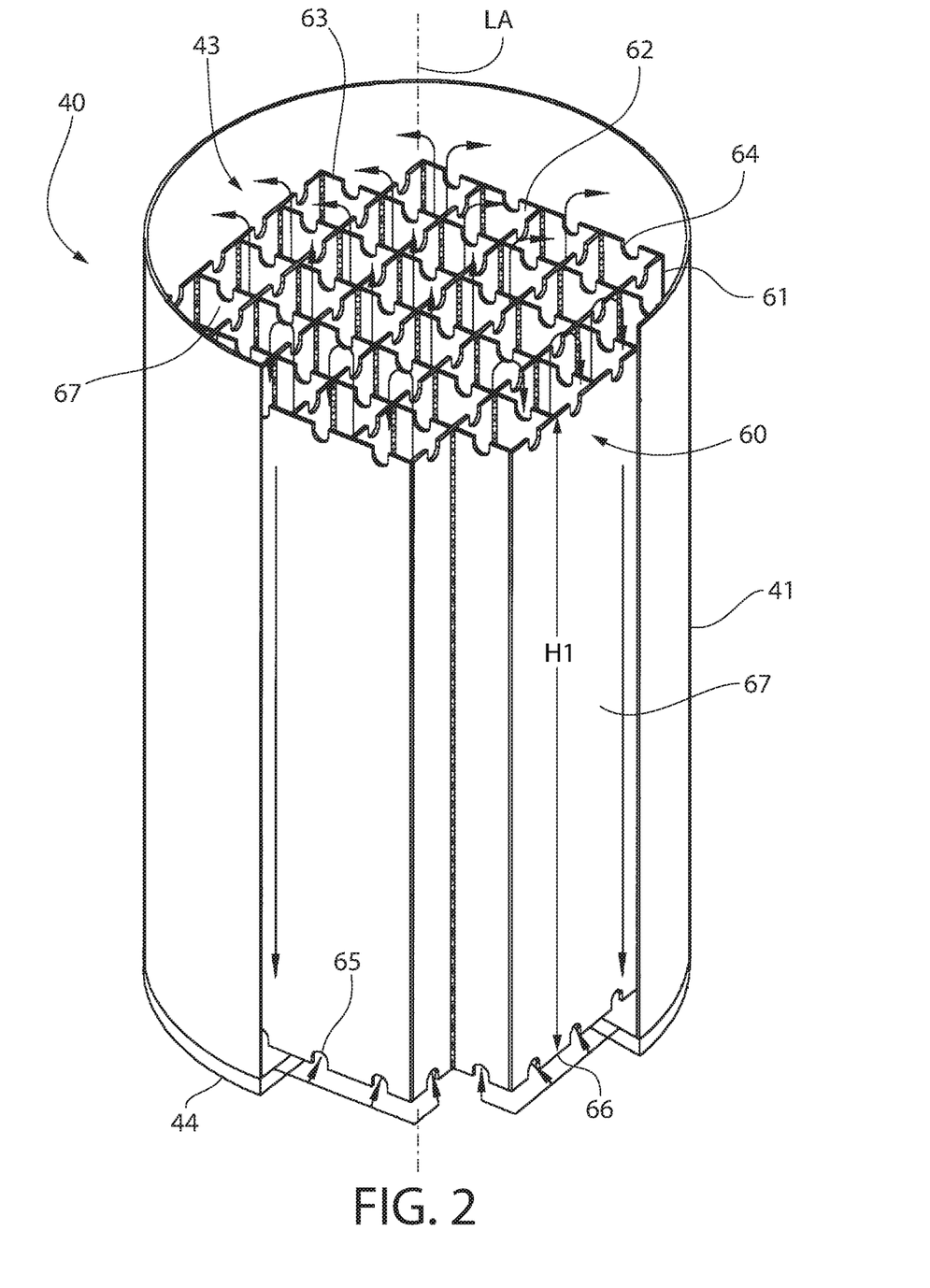
FIG. 2 is a perspective view of the canister and fuel basket.
Figure 3:
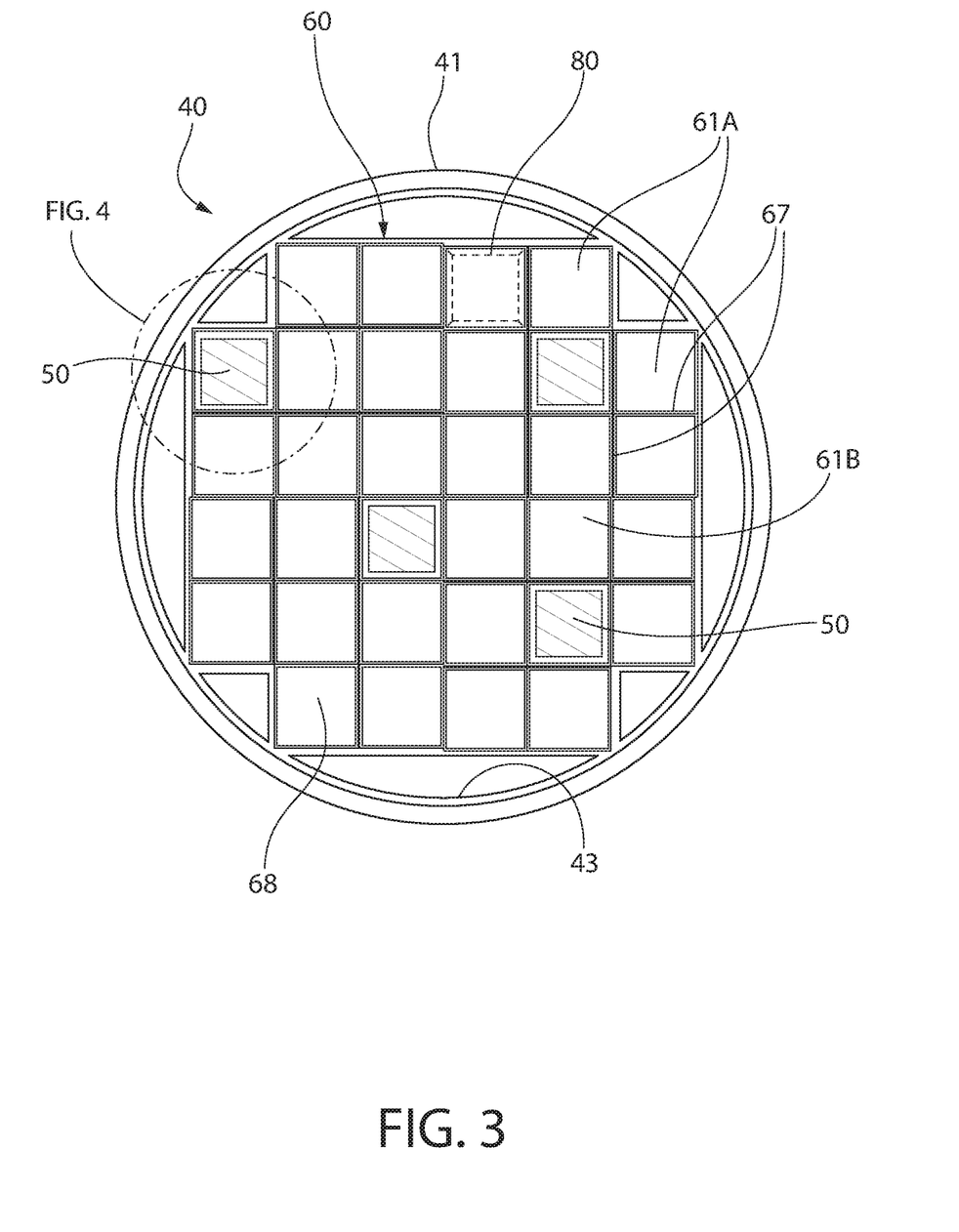
FIG. 3 is top plan view thereof.

Fuel assembly storage canister 40 is shown removably inserted and disposed in central cavity 28 of the outer cask 20. Referring to FIGS. 1-3, canister 40 generally comprises a vertically elongated cylindrical shell 41, baseplate 44 at bottom, and sealable/weldable lid 42 at top, which collectively form the confinement boundary for the stored fuel assemblies 50 (see, e.g. FIG. 6). The confinement boundary may be a completely seal-welded hermetically closed enclosure of all stainless steel construction in one embodiment to resist corrosion.

Figure 6:
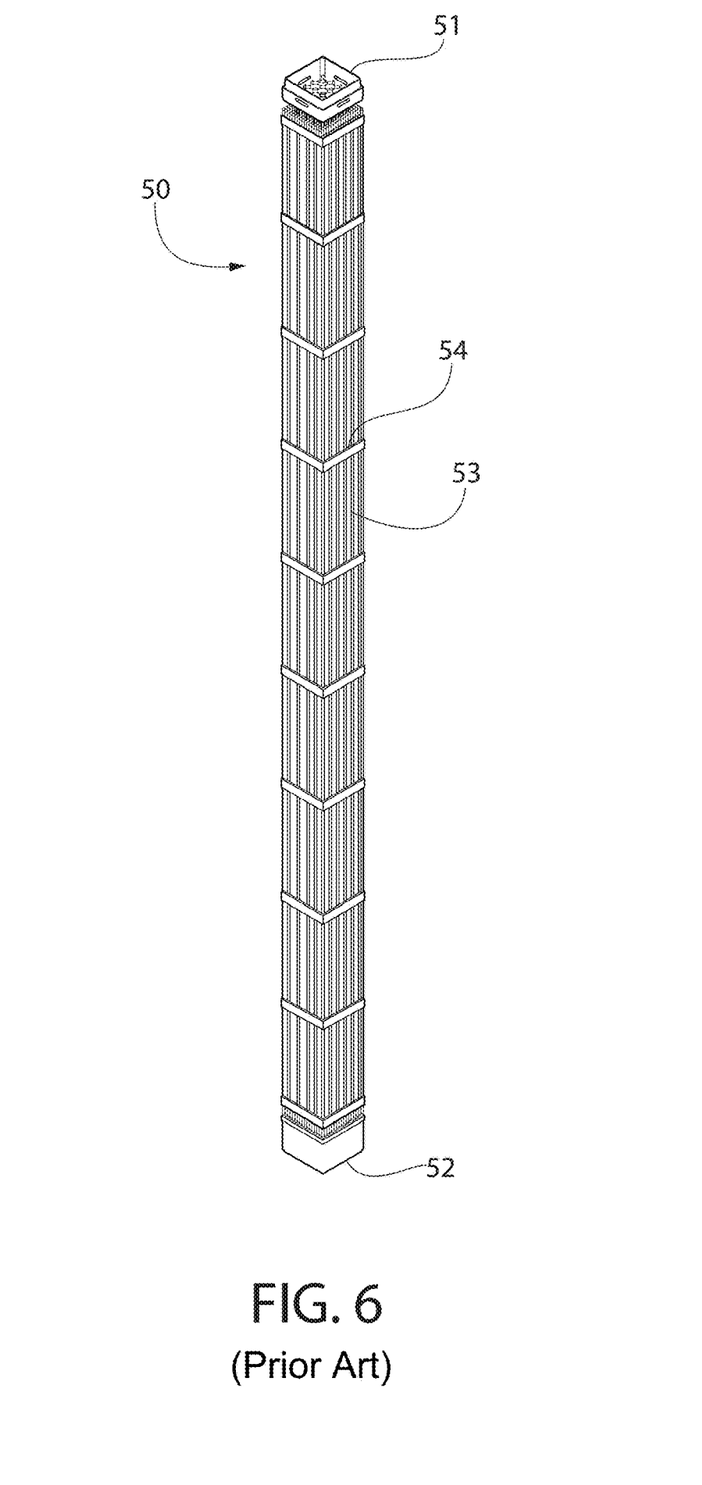
FIG. 6 is a perspective view of a typical fuel assembly storage in the tubes and cells of the fuel basket.

Nuclear fuel assemblies 50 shown in FIG. 6 are well known in the art. They are vertically elongated box-like assemblies of square cross-sectional configuration generally comprising a top nozzle box 51, bottom nozzle box 52, and a plurality of fuel rods 53 extending therebetween which contain the uranium fuel pellets. The assembly is held together generally by a plurality of vertically spaced bands 54.

The canister 40 defines a vertically-extending internal cavity 43 which holds a fuel basket 60 having a composite cell structure with a rectilinear honeycomb-like construction. In one embodiment, basket 60 may be formed by a plurality of tightly packed adjacent elongated open prismatic tubes 61 of rectangular cuboid shape and square transverse cross section. The tubes 61 may be formed by individual tubular elements as shown in FIG. 1, or by a welded rectilinear array of plates assembled and arranged to collectively form the tubes as shown in FIG. 2. In other embodiments, the tubes 61 may be formed by slotted interlocking plates as shown in commonly-owned U.S. Pat. Nos. 5,898,747 and 8,712,001, which are incorporated herein by reference. Accordingly, there are numerous ways that may be used to form the prismatic tubes which are not limiting of the invention and use of the radiation attenuation inserts disclosed herein.

The tubes 61 each define elongated open top fuel assembly storage cells 62 therein each having a rectilinear square transverse cross section configured and dimensioned to insert and hold a single fuel assembly 50. The tubes 61 are supported by baseplate 44 at their bottom ends as further described herein. The fuel assemblies 50 may be inserted into the cells 62 and transferred from a fuel storage rack submerged in a spent fuel pool of a nuclear reactor containment structure to the canister 40 while underwater in the pool 60 to minimize radiation levels. The canister 40 may be a multi-purpose canister (MPC), which are further described in commonly-owned U.S. Pat. Nos. 7,096,600 and 5,898,747, which are incorporated herein by reference.

Referring to FIGS. 1-3, fuel assembly storage canister 40 defines a vertical longitudinal axis LA and comprises a grid array of closely packed open storage cells 62 formed by the closely spaced storage tubes 61. The plurality of adjacent elongated storage tubes 61 are arranged in parallel axial relationship to each other. The fuel basket 60 comprises peripherally arranged exterior or outboard tubes 61A forming an annular array of tubes which define a perimeter of the fuel basket, and interior or inboard tubes 61B located in a central region of the basket inside the outboard tubes. Tubes 61A-B are coupled at their bottom ends to the planar top surface of baseplate 44 as previously described herein, and extend upwards in a substantially vertical orientation therefrom. In this embodiment, the vertical or central axis of each tube 61 is not only substantially vertical and parallel to longitudinal axis LA and each other, but also substantially perpendicular to the top surface of the baseplate 44. In one embodiment, tubes 61 may be fastened to baseplate 44 by welding and/or mechanical coupling such as bolting, clamping, threading, etc.

Tubes 61 include an open top end 63 for insertion of fuel assemblies into the internal cavity 68 formed by the inner surfaces of the tube sidewalls 67 (cell walls), bottom end 66, and a plurality of longitudinally extending vertical sidewalls 67 ("cell walls") between the ends and defining a tube or cell height. Each tube 61 defines an internal cell cavity 68 extending longitudinally between the top and bottom ends 63, 66. In the embodiment shown, four perpendicularly oriented tube sidewalls 67 are arranged in rectilinear polygonal relationship forming either a square tube as shown or rectangular tube in other embodiments in lateral or transverse cross section (i.e. transverse or orthogonal to longitudinal axis LA as seen in FIG. 3). Fuel assembly storage cells 62 and their internal cell cavities 68 accordingly have a corresponding rectilinear configuration in lateral cross section. Tubes 61 have a complementary configured transverse cross section to the fuel assemblies 50.

Fuel assembly storage tubes 61 may be made of any suitable preferably corrosion resistant metallic material, such as without limitation stainless steel or others. Baseplate 44, shell 41, and lid 42 may be made of the same or a different preferably corrosion resistant metal.

It will be appreciated that each tube 61 of the fuel basket 60 can be formed as a single unitary structural component that extends the entire desired total height H1 of the tube, or can be constructed of multiple partial height tubes that are vertically stacked and connected together such as by welding or mechanical means which collectively add up to the desired total height. It is preferred that the height H1 of the tubes 61 be sufficient so that the entire height of a fuel assembly 50 may be contained completely within the tube when the fuel assembly is inserted. The top ends 63 of tubes 61 may preferably but not necessarily terminate in substantially the same horizontal upper reference plane (defined perpendicular to longitudinal axis LA) so that the tops of the tube are level with each other. The baseplate 44 at the bottom ends 66 of the tubes terminate at and define a second horizontal lower reference plane.

Figure 5:
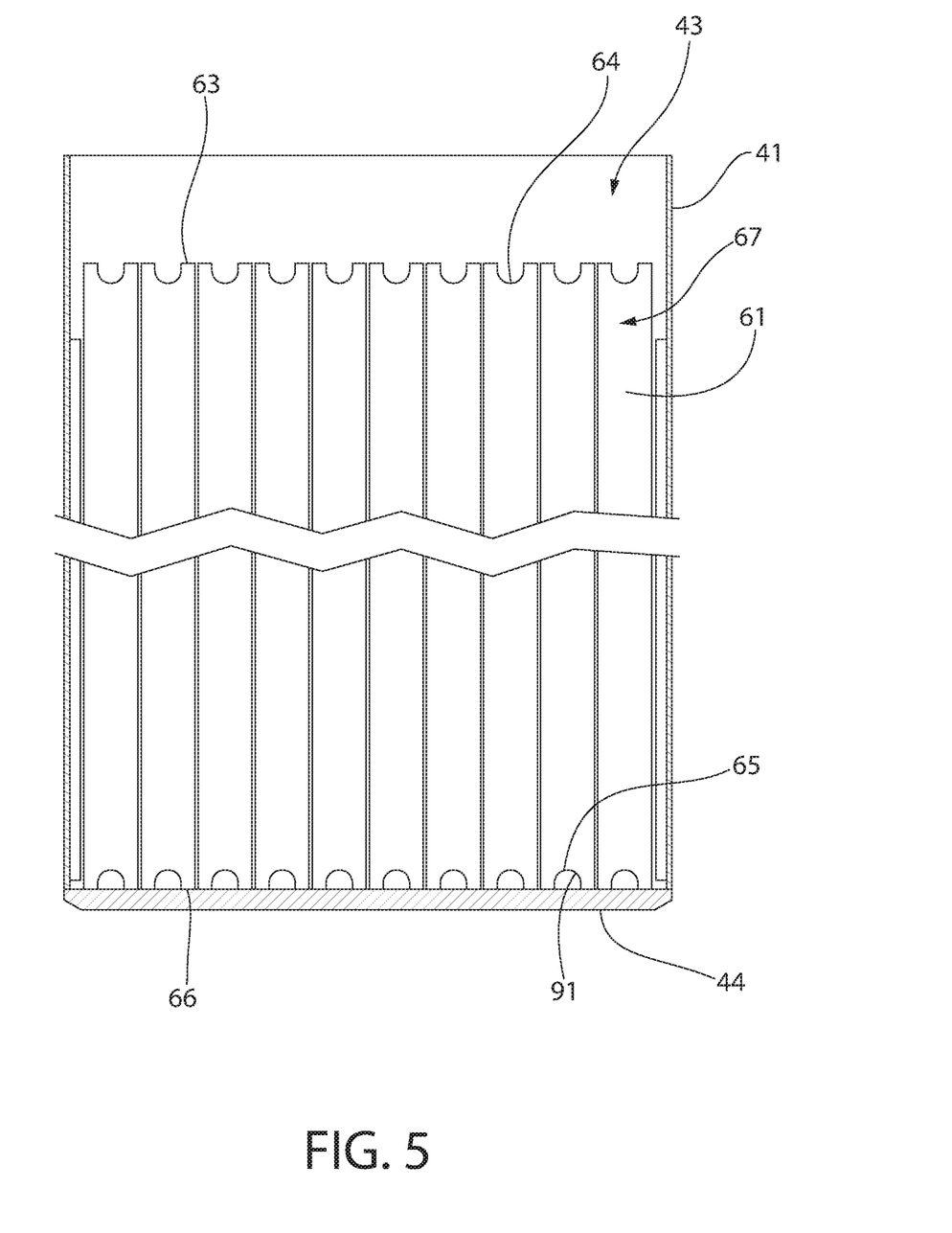
FIG. 5 is side cross-sectional view of the storage canister showing an array of fuel assembly storage tubes.

In one embodiment as shown in FIGS. 2 and 5, the top ends 63 of each tube sidewall 67 (cell walls) may be castellated or scalloped to define an upper flow cutout 64 used to initially dry the wetted canister 40 and fuel assemblies stored therein via air or an inert gas flow (e.g. nitrogen) after loading and removal of the assemblies from the spent fuel pool. The bottom ends 66 of tubes 61 may also similarly include air or gas lower flow cutouts 65. The flow cutouts 64, 65 may be upwardly and downwardly open respectively, as shown. In one embodiment, the cutouts may be semi-circular or arcuate in shape as shown; however, any suitable shaped cutouts may be used. In other embodiments, the cutouts may have a non-rectilinear polygonal (e.g. triangular, hexagonal, etc.) or rectilinear polygonal configuration such as a square or rectangular shape somewhat similar to the square cutouts in the radiation attenuation inserts seen in FIG. 7. A combination of shapes may be used for the flow cutouts. Gas dehydration systems suitable for drying the canister 40 include commonly-owned U.S. Pat. No. 7,210,247, which is incorporated herein for reference.

The metallic radiation attenuation insert 80 (dose attenuation device) will now be further described with reference to FIGS. 3-4 and 7-9. Attenuation insert 80 has a vertically elongated prismatic tubular body and shape comprising an open top end 81, open bottom end 82, and four perpendicularly arranged vertically elongated sidewalls 83 extending between the ends. Insert 80 is completely closed-sided by the sidewalls 83 with no gaps therein forming a complete lateral enclosure for the fuel assembly 50. An internal chamber 84 defined by the sidewalls 83 extends preferably for the full length or height H2 of insert from end to end. Chamber 84 is configured and dimensioned in transverse cross section to hold a single fuel assembly 50. Height H2 of the attenuation insert 80 is preferably substantially coextensive with the height H1 of the fuel basket tubes 61 for full lateral radiation shielding. The bottom ends 82 of each attenuation insert 80 are preferably flat and linear to rest on the flat top surface of the baseplate 44 of the canister 40 adjacent to and inside the bottom ends of the tubes 61 in which the inserts are placed. The bottom ends of the inserts 80 and tubes 61 therefore terminate in the same horizontal plane defined by the top surface of the baseplate 44.

Attenuation insert 80 preferably has a rectangular box-like or cuboid configuration with rectilinear transverse cross section complementary configured to the cross section of the tube 61 in which it is inserted. Each attenuation insert is configured to be inserted into and nest inside the perimetrically extending annular square gap G formed between a fuel assembly 50 and the inner surface of the vertical sidewalls 67 (cell walls) of each tube within its cell cavity 68 which forms the fuel assembly storage cell 62 (best shown in FIGS. 3 and 4). The attenuation insert 80 therefore functions as a thin liner a fuel basket tube 61 or cell 62 which takes advantage of the available space or gap G between the fuel assembly 50 and cell walls to attenuate radiation. The vertical centerline of the insert 80 is coaxial with the vertical centerline of the storage tube 61 when positioned therein. In some preferred embodiments, the insert 80 has a sidewall thickness which may be less than the thickness of the tube sidewalls 67 (see, e.g. FIG. 9). This is possible because the liner do not provide the majority of support for the fuel assembly 50 in contrast to the fuel basket tubes 61. In some examples, the thickness of the insert sidewalls 83 may be from about and including 10-gauge to 16-gauge (metal gauge). The tube sidewalls 67 are thus thicker than the insert gauge selected. The thickness of the insert sidewalls 83 will vary depending on the available cavity 68 to fuel assembly 50 clearance gap G, and the allowable weight of the waste fuel.

Figure 7:
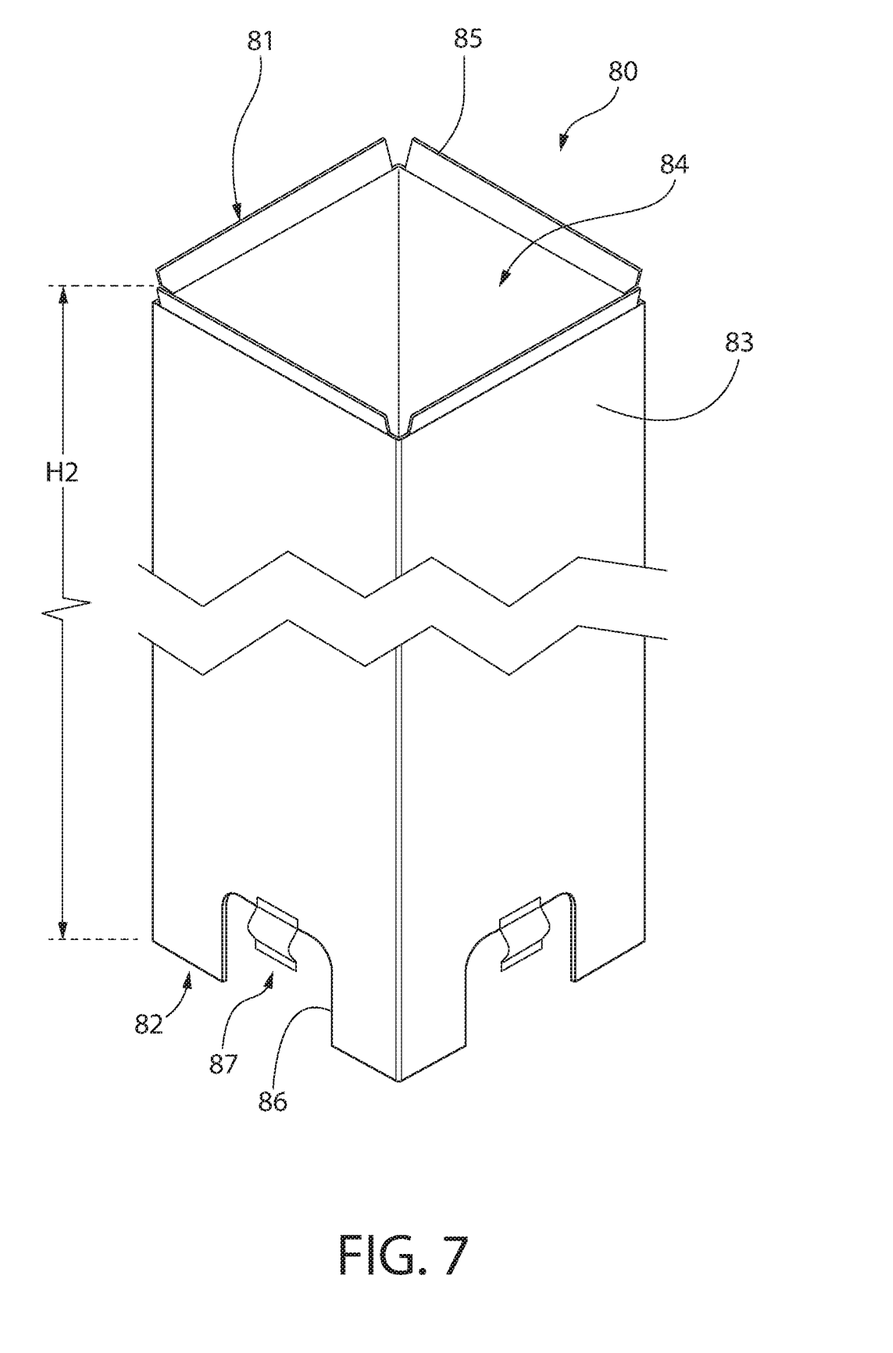
FIG. 7 is a perspective view of the radiation attenuation insert according to the present disclosure.
Figure 8:
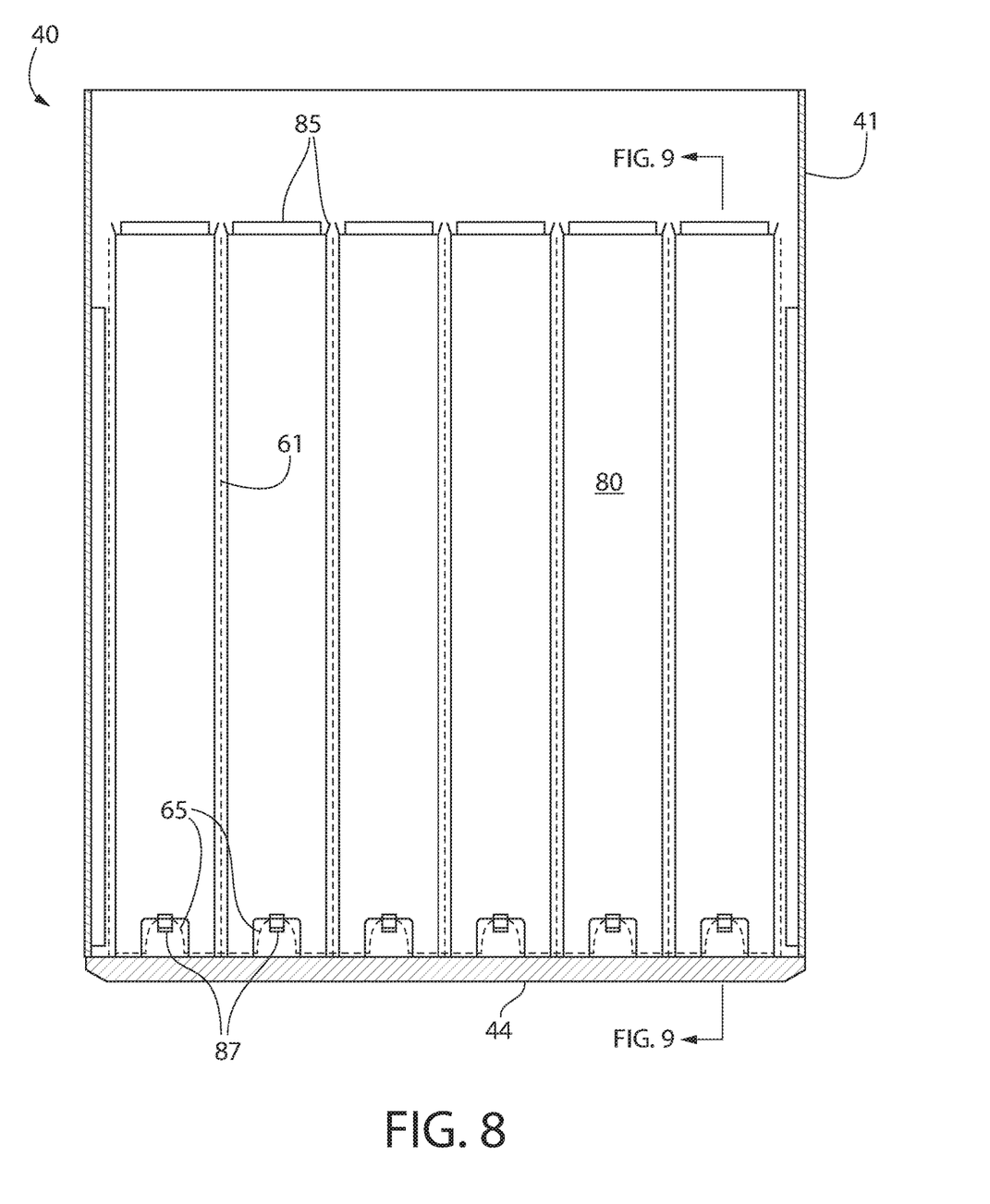
FIG. 8 is a side cross-sectional view of the storage canister showing an array of the radiation attenuation inserts therein and supported on a baseplate of the canister.
Figure 9:
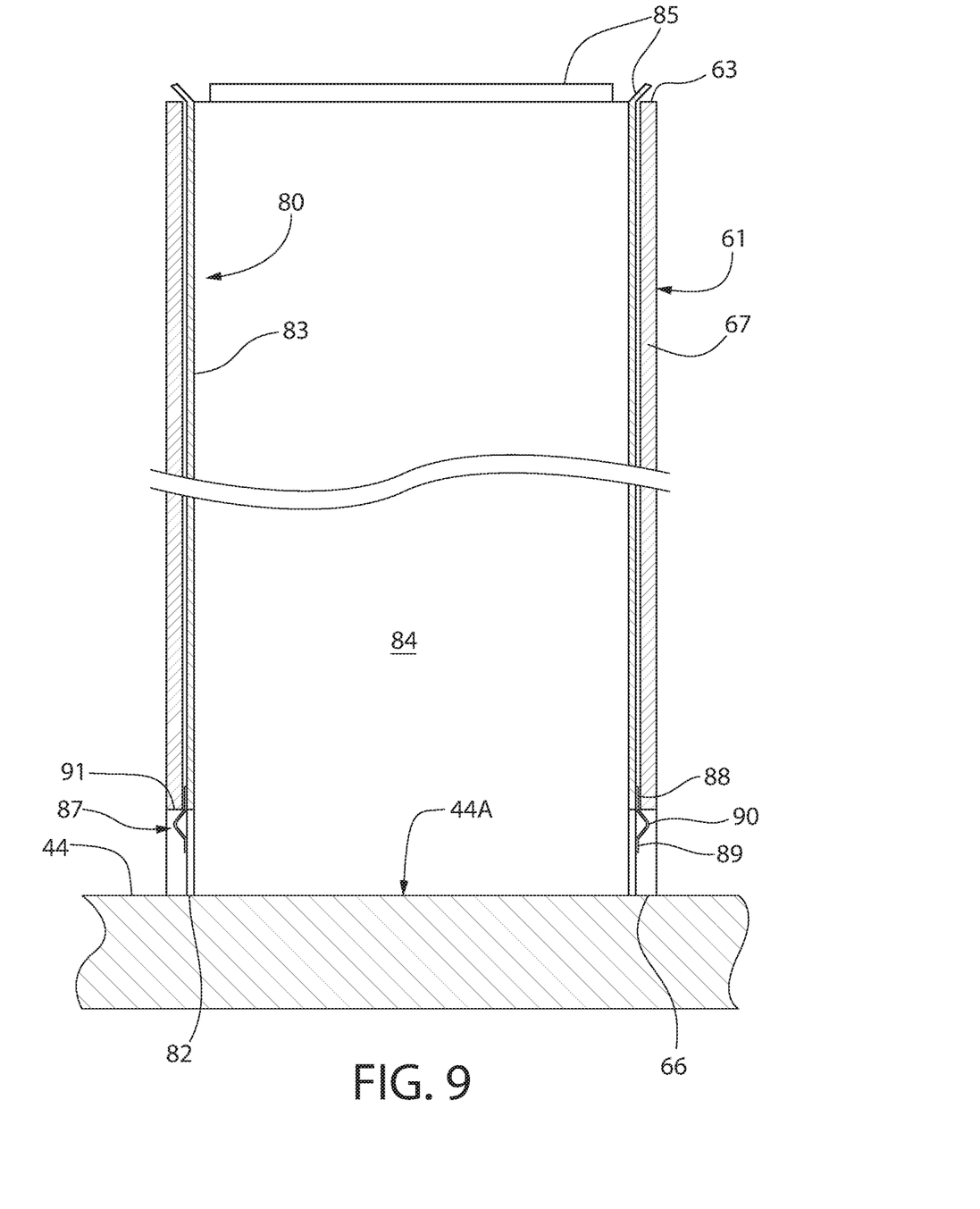
FIG. 9 is a cross-sectional view of one of the storage cells of the fuel basket assembly showing a radiation attenuation insert installed in a storage tube.

To secure the attenuation insert 80 in axial position within and relative to its respective fuel basket storage tube 61, each insert includes an upper and lower axial retention or securement feature configured to engage and retain the insert in position inside the tube. In one embodiment, the upper axial securement feature may be formed by outwardly flared and angled securement flanges 85 extending generally upwards from the top end of the attenuation insert sidewalls 83 as best shown in FIGS. 7-9. The outwardly flared flanges 85 are arranged to engage the top edges of the fuel assembly storage tubes 61 at the top end 63 of each cell 62, thereby effectively locking the attenuation insert 80 in vertical axial position inside and relative to the cell. In one preferably construction, each attenuation insert sidewall 83 has a securement flange 85 to secure the top end of the insert to the storage tube 61 of the fuel basket 60. The inclined or sloped surfaces defined by the angled securement flanges further facilitates sliding entry of the fuel assembly 50 into the radiation attenuation insert 80 when lowered by overhead equipment. This helps center the fuel assembly relative to the insert.

The lower securement feature of the attenuation inserts 80 in one embodiment may include one or more axial restraints configured to further lock and fixate the bottom end of each insert in vertical axial position within the storage cells 62 of the fuel basket 60. Referring to FIGS. 5 and 7-9, the axial restraints in one non-limiting embodiment may each be formed by elastically and resiliently deformable locking members which may be in the form of a metal leaf spring angle clips 87. Angle clips 87 each have an elongated and undulating body formed of corrosion resistant spring steel. Clips 87 each include an upper fixed end portion 88 rigidly attached to the exterior surface of a attenuation insert sidewall 83 and an opposite resiliently movable and cantilevered lower free-end locking portion 89. Fixed end portion 88 may be substantially flat and parallel to the longitudinal axis LA and insert sidewall 83. Fixed end portion 88 is fixedly attached to the exterior surface of the insert sidewall 83 by any suitable means, such as without limitation welding, riveting, brazing, or threaded or un-threaded fasteners (e.g. screws, rivets, etc.) in some non-limiting examples.

Locking portion 89 of angle clip 87 extends downwardly from fixed end portion 88 and includes an obliquely angled locking protrusion 90 configured to engage the lower end portion of storage tube 61. The lower-most end of locking portion 89 may be substantially flat and parallel to the longitudinal axis LA and insert sidewall 83. Locking protrusion 90 may be located between this lower-most end and upper fixed end portion 88 as shown in some embodiments.

Locking protrusion 90 of angle clip 87 may be generally triangular shaped in some embodiments as shown and projects laterally outwards from and beyond the sidewall 83 of the attenuation insert 80 to engage the storage tube 61. The triangular shape of the locking protrusion 90 advantageously allows it to automatically and detachably engage the storage tube 61 when fully inserted therein, and to be axially withdrawn (in a direction parallel to longitudinal axis LA) when a dedicated and sufficient axial force is applied to pull the insert upwards out of its storage tube. This also beneficially permits the radiation attenuation inserts 80 to be readily removed, re-used, and changed in position within a different cell 62 of the fuel basket 60 as needed based on the lateral radiation emission rates from different areas of the basket.

The locking spring angle clips 87 are positioned on the lower half of the attenuation insert 80 and arranged to engage an available locking surface or edge 91 disposed on the lower half of the fuel assembly storage tubes 61 in the fuel basket 60. In one embodiment, the angle clips 87 may be proximate to and spaced above the bottom end 82 of the insert 80. Clips 87 are located and in a position to detachably but lockingly engage a free bottom locking edge 91 of the storage tube 61 when the insert is fully inserted into its respective storage tube 61 and abuts the top surface 44A of the common baseplate 44. In one embodiment, the bottom locking edge 91 of the tube 61 may be defined by its lower flow cutouts 65 (see also FIG. 5). Spring angle clips 87 may be laterally/horizontally centered between the vertical edges of each attenuation insert sidewall 83 as shown in FIGS. 7-9. In the illustrated embodiment, this coincides with the centered position of the flow cutouts 65. In one embodiment, the angle clips 87 are mounted proximate to the bottom end 82 of the attenuation insert 80 just above and at a downwardly open flow cutout 86. Angle clips 87 are vertically aligned with the flow cutouts 86. Each sidewall 83 of the radiation attenuation insert 80 may include a flow cutout 86 to promote uniform air or inert gas flow throughout the fuel basket 60 when the fuel assemblies 60 are dried after removal from the wet spent fuel pool. Preferably, the flow cutouts 86 are horizontally/laterally aligned with and overlap a respective lower flow cutout 65 formed in the storage tubes 61. This advantageously forms a continuous substantially linear lateral air/gas flow path through the sidewalls of the tube 61 and radiation attenuation insert 80 into the interior chamber 84 of each radiation attenuation insert from all sides in which the fuel assembly 60 to be dried is positioned. Accordingly, the placement of the flow cutouts 86 in radiation attenuation inserts 80 is one important feature which does not impede the flow of drying air/gas through the fuel basket assembly of tubes 61.

FIG. 2 depicts air/gas flow arrows showing the direction thereof during normal drying of a wet fuel assembly storage canister 40. Air/gas is typically forced or drawn into the canister 40 through tube or valve fittings in the canister lid 42, and then flows downwards in the annular space between the fuel basket 60 and inner surface of the canister shell 41 as shown (see vertical flow arrows). The air/gas reaches the bottom of the canister 40 (baseplate 44), and then flows radially inwards through the lower flow cutouts 65 in the tube sidewalls 67 and mating through flow cutouts 86 in the radiation attenuation inserts 80 therein (not visible in FIG. 2). The air/gas flows upwards through the radiation attenuation inserts and fuel assemblies 50 eventually exiting the tops of the inserts and tubes 61 as shown from whence the air/gas is extracted back through the lid 42 to the dehydration or vacuum drying system as previously described herein.

In one configuration, the radiation attenuation insert flow cutouts 86 may be substantially rectilinear in shape as seen in the illustrated embodiment (some rounding of the corners may be used as shown to eliminate stress concentration factors in the insert metal which could lead to cracking at these locations). The angle clip 87 protrudes downwards into the opening formed by flow cutout 86 to engage the locking edge 91 of the fuel assembly storage tube 61. Other shaped flow cutouts 86 may be used including any suitable non-rectilinear polygonal and non-polygonal configurations.

It bears noting that the use of the insert flow cutouts 86 advantageously allows the radiation attenuation insert 80 to have a height substantially coextensive with the height of the tubes 61 in which the inserts are placed for optimum lateral radiation shielding, and further to be supported by the common canister baseplate 44 along with the tubes.

Any suitable number of spring angle clips 87 may be provided. In one embodiment, each sidewall 83 of the attenuation insert 80 has a respective angle clip as shown for maximum securement of the bottom end 82 of the attenuation insert 80 to its respective storage tube 61. In other possible embodiments, however, only some of the sidewalls 83 may include an angle clip 87. If each sidewall 83 does not have its own angle clip, preferably at least two angle clips 87 are provided; each one being on opposite sidewalls of the insert 80 for balanced securement.

The locking protrusion or spring angle clip 87 is resiliently movable and deformable between an inward deflected and retracted position for sliding the attenuation insert 80 into and vertically along the fuel assembly storage tube 61 or cell 62 in cavity 68, and an outward undeflected and extended position for engaging the locking edge 91 of storage tube 61.

Figure 4:
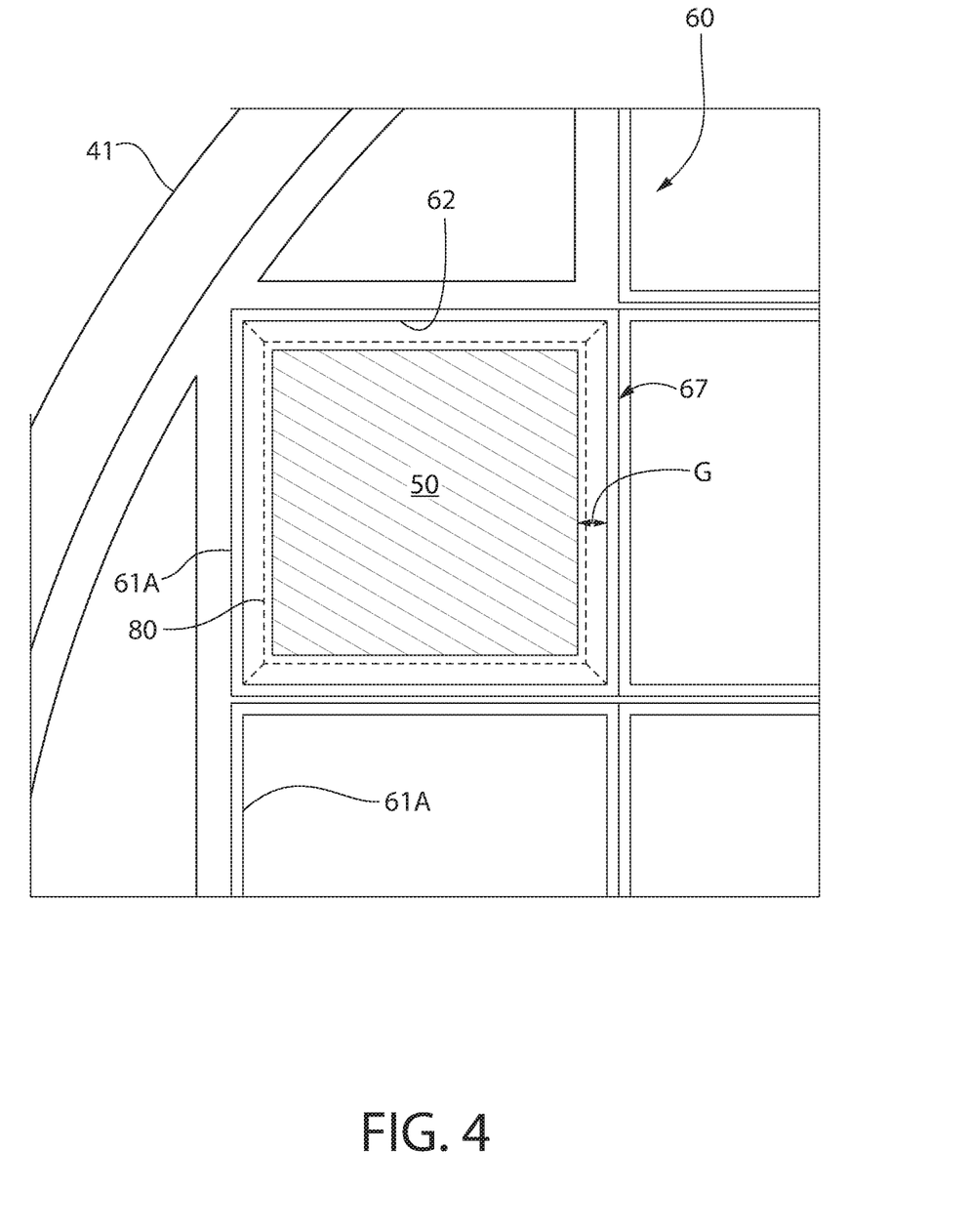
FIG. 4 is an enlarged detail taken from FIG. 3 showing a fuel assembly and radiation attenuation insert according to the present disclosure disposed in a peripheral cell of the fuel basket.

As previously described herein, the radiation attenuation inserts 80 are preferably inserted and secured in only the outermost peripheral outboard tubes 61A in one embodiment (see, e.g. FIGS. 3 and 4 showing inserts in some of the outboard tubes as an example). Because most of the radiation emanating from the fuel basket 60 in the lateral direction is from the fuel assemblies 50 located in these peripheral outboard tubes 61A and cells 62, the insert may be installed only in those peripheral cells that have a measured high radiation emission rate. This may includes some of the outboard tubes 61A, or all of the outboard tubes in various embodiments to form a complete radiation barrier around the entire perimeter of fuel basket 60 to absorb radiation emanating in the lateral direction from the basket 60. In some embodiments, certain ones of the inboard tubes 61B may also have a radiation attenuation insert 80 if they appear problematic from a lateral radiation emission standpoint in addition to some or all of the outboard tubes 61A.

Operation of the attenuation insert securement features including the locking protrusion or spring clip 87 and angled flanges 85 will become evident by describing a method for installing the tubular radiation attenuation insert 80 in an example storage cell 62 of fuel basket 60. A suitable peripheral cell 62 candidate may first be selected for locking the insert 80 in the outboard tube 61A of the fuel basket 60 (see, e.g. FIG. 4). The canister 40 and fuel basket 60 may be still submerged in the spent fuel pool in some embodiments and radioactively active. In the following scenario, the fuel assembly 50 has not yet been installed in the selected outboard tube 61A, or if already present may first be removed. However, in other embodiments, the present attenuation insert 80 may advantageously be installed in a tube 61 with the fuel assembly 50 already positioned in the cell 62 if necessary. It bears noting that the following operations are typically performed by heavy equipment in the nuclear facility such as an overhead crane and/or hoist used to handle and maneuver the canister 40 with preinstalled fuel basket tubes 61, fuel assemblies 50, and radiation attenuation inserts.

A radiation attenuation insert 80 is first positioned over and axially aligned with the selected peripheral outboard tube 61 and its storage cell 62. The locking spring angle clips 87 are initially in their outward undeflected and extended position (see, e.g. FIG. 7). An overhead hoist or crane may be used to deploy and maneuver the insert 80. The insert 80 is then slowly lowered vertically into the tube 61 and its cell cavity 68 through the open top end 63 of the tube. After the bottom end 82 of the attenuation insert 80 passes downward and through the tube top end 63, the locking spring angle clips 87 (locking portion 89) slideably engage the top end. This causes the angle clips 87 to compress and elastically deform inwards to the deflected and retracted positions against the inner surface of the storage tube sidewalls 67. As the absorber insert 400 continues to be lowered and slide farther downwards into the cell 62, the locking portions 89 of angle clips 87 remains in the compressed retracted position. When the angle clip locking portions 89 (i.e. locking protrusion 90) eventually passes beneath the locking edge 91 of storage tube 61A in the lower portion of the tube, the spring angle clips 87 will each snap back outwards via their elastic memory to their initial extended positions, thereby catching and lockingly engaging the locking edges 91 of the tube 61A formed by the tube's lower flow cutouts 65 (see, e.g. FIGS. 8 and 9). This locking engagement between the tube 61A and locking portion 89 of each angle clip 80 resists axially withdrawing the attenuation insert 80 from the storage tube 61A and cell 62 when not applying an intentionally strong upward pulling force on the attenuation insert 80 via the crane or hoist with the intention of removing the insert from the fuel basket 60. The bottom end 82 of the radiation attenuation insert 80 engages the top surface 44A of the canister baseplate 44 inside the bottom end 66 of the storage tube 61A (see, e.g. FIG. 9).

In other possible embodiments, the radiation attenuation insert 80 may be provided with locking angle clips 87 and instead permanently installed inside the storage tube 61 via any suitable means, such as welding, soldering, brazing, fasteners such as rivets or screws/bolts, etc.

As previously described herein, the gamma radiation attenuation insert 80 in some embodiments may preferably be formed of a non-boron containing material and non-ferrous metal due to their high specific gravity and concomitant high densities in contrast to other materials. A preferred metallic material selected also further preferably has a high thermal conductivity to dissipate heat emitting by the decaying nuclear fuel in the fuel basket. The material selected should preferably also be sufficiently rigid to form a self-supporting tubular construction for the gamma radiation attenuation inserts. In one preferred embodiment, copper may be used for insert 80 due to both its high thermal conductivity and high specific gravity which makes it more efficient at radiation attenuation and heat dissipation than other metals. If heat dissipation is not a major concern or criteria, however, then the insert 80 may be made of other less thermally conductive materials such as austenitic stainless steel which is not as good a conductor of heat and has a lower density (e.g. 7.5-8.0 g/cc) than copper (e.g. 8.9 g/cc). Other possible metallic materials which may be used as candidates for insert 80 if heat dissipation is not an overriding concern include Inconel® (e.g. 8.5 g/cc), Monel® (e.g. 8.4-8.8 g/cc), aluminum bronze (7.7-8.7 g/cc), Admiralty brass (e.g. 8.53 g/cc), copper-nickel alloy (cupronickel (e.g. 8.9 g/cc), and precipitation-hardened stainless steel (e.g. 7.8 g/cc). The foregoing densities are representative and not necessarily absolute values of all grades or alloys of the listed materials.

While the inventive concepts described herein have been illustrated with a spent fuel assembly fuel basket formed of square shaped storage tubes/storage cells and complementary configured radiation attenuation inserts, the fundamental design concept disclosed herein is also applicable to fuel cells of different cross-sectional shapes such as for example without limitation rectangular, other polygonal cross-sectional shapes such as triangular, hexagonal, and non-polygonal cross-sectional shapes. An example of a fuel storage assembly with circular fuel tubes/cells is shown for example in commonly-owned U.S. Pat. No. 8,929,504 which is incorporated herein by reference. An example of a fuel storage assembly with hexagonal shaped tube for hexagonal shaped fuel assemblies commonly used in Russian PWRs is shown for example in commonly-owned U.S. Pat. No. 9,728,284, which is incorporated herein by reference.

Regardless of the cross-sectional shape of the radiation attenuation inserts, they may include the same features such as the outwardly flared flanges and spring clips disclosed herein, or other retention/securement features.

While the foregoing description and drawings represent some example systems, it will be understood that various additions, modifications and substitutions may be made therein without departing from the spirit and scope and range of equivalents of the accompanying claims. In particular, it will be clear to those skilled in the art that the present invention may be embodied in other forms, structures, arrangements, proportions, sizes, and with other elements, materials, and components, without departing from the spirit or essential characteristics thereof. In addition, numerous variations in the methods/processes described herein may be made. One skilled in the art will further appreciate that the invention may be used with many modifications of structure, arrangement, proportions, sizes, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims and equivalents thereof, and not limited to the foregoing description or embodiments. Rather, the appended claims should be construed broadly, to include other variants and embodiments of the invention, which may be made by those skilled in the art without departing from the scope and range of equivalents of the invention.

What is claimed is:

1. A storage apparatus with gamma radiation shielding for spent nuclear fuel comprising:
    a fuel basket comprising a plurality of elongated fuel storage tubes extending along a longitudinal axis, each of the tubes defining a cell configured to hold a nuclear fuel assembly;
    a plurality of gamma radiation attenuation inserts each one of which is nested inside a respective cell of at least some of the storage tubes of the fuel basket;
    each radiation attenuation insert comprising a longitudinally elongated tubular body including an open top end, a bottom end, and plurality of sidewalls extending between the ends;
    wherein the radiation attenuation insert is composed of a dense material operable to block gamma radiation;
    each radiation attenuation insert including a downwardly open flow cutout formed in each sidewall of the insert at its bottom end;
    each storage tube containing a radiation attenuation insert including a downwardly open flow cutout formed in each sidewall of the tube at its bottom end, the flow cutouts in the tube each being laterally aligned with and overlapping a corresponding one of the flow cutouts of the radiation attenuation insert;
    an elastically deformable spring angle clip affixed to each sidewall of each radiation attenuation insert, each angle clip protruding laterally outwards and downwards from the sidewall into the flow cutout of the radiation attenuation insert and engaging a corresponding locking edge formed by the flow cutout on its respective storage tube when the insert is fully inserted into the storage tube;
    wherein the flow cutouts of the storage tubes and radiation attenuation insert remain open after being engaged by one of the angle clips such that air or gas can pass through the flow cutouts.

2. The apparatus according to claim 1, wherein the radiation attenuation insert is formed of a non-ferrous material having a density greater than 8.0 grams/cubic centimeter.

3. The apparatus according to claim 2, wherein the non-ferrous material is selected from the group consisting of copper, aluminum bronze, Admiralty brass, and copper-nickel alloy.

4. The apparatus according to claim 2, wherein the non-ferrous material is copper.

5. The apparatus according to claim 1, further comprising a nuclear fuel assembly disposed in a longitudinally-extending internal chamber of a first insert of the plurality of radiation attenuation inserts, the first insert arranged in a gap between cell walls of a first tube of the plurality of tubes and the fuel assembly.

6. The apparatus according to claim 1, wherein the radiation attenuation inserts have a height substantially coextensive with heights of the storage tubes.

7. The apparatus according to claim 6, wherein the radiation attenuation inserts and the storage tubes are affixed to and supported by a common baseplate.

8. The apparatus according to claim 1, further comprising an elastically deformable locking member affixed to each sidewall of each radiation attenuation insert proximate to the bottom end of the insert, the locking member including an outwardly projecting locking protrusion configured to detachably engage a corresponding locking edge formed proximate to a bottom end of the storage tube in which the insert is inserted.

9. The apparatus according to claim 8, wherein each locking member has an undulating body formed of spring steel including an upper fixed end portion rigidly attached to an exterior surface of the radiation attenuation insert sidewall, and a resiliently deformable and cantilevered lower free-end locking portion which defines the locking protrusion.

10. The apparatus according to claim 9, wherein the locking protrusion has a triangular shape.

11. The apparatus according to claim 8, further comprising an outwardly flared and angled securement flange extending upwards from the top end of the sidewalls of each radiation attenuation insert sidewalls, the securement flanges arranged and configured to engage a top end of a respective storage tube in which each insert is inserted.

12. The apparatus according to claim 6, wherein the plurality of storage tubes includes peripheral outboard tubes forming a perimeter of the fuel basket and inboard storage tubes disposed in a central region of the fuel basket inside the outboard tubes, and wherein the radiation attenuation inserts are disposed in some of the outboard tubes.

13. The apparatus according to claim 1, wherein all of the peripheral outboard tubes contain a radiation attenuation insert forming a continuous barrier against radiation emanating in a lateral direction from the fuel basket.

14. A storage apparatus with gamma radiation shielding for spent nuclear fuel comprising:
    a canister comprising a baseplate and an elongated cylindrical shell defining an internal cavity;
    a fuel basket disposed in the internal cavity, the fuel basket comprising a plurality of metal fuel storage tubes extending upwards from the baseplate along a longitudinal axis and each defining a fuel storage cell;
    a gamma radiation attenuation insert nested inside a first cell of a first tube of the fuel basket;

the radiation attenuation insert comprising a longitudinally elongated cuboid body including open top and bottom ends, and a plurality of sidewalls extending between the ends;

an upper securement feature of the radiation attenuation insert engaging a top end of the first tube; and an elastically deformable lower securement feature on the radiation attenuation insert engaging a bottom end portion of the first tube and configured to detachably affix the radiation attenuation insert to the first tube;

wherein the radiation attenuation insert is composed of a dense material operable to block gamma radiation;

wherein the radiation attenuation insert further includes a downwardly open flow cutout formed in each sidewall of the insert at its bottom end;

wherein the first tube also includes a downwardly open flow cutout laterally aligned with the flow cutout of the radiation attenuation insert;

wherein the lower securement feature comprises an elastically deformable spring angle clip affixed to one sidewall of the radiation attenuation insert, the angle clip protruding downwards from the one sidewall into the flow cutout of the radiation attenuation insert and having a locking protrusion engaging a corresponding locking edge formed on a corresponding downwardly open flow cutout of the first tube when the insert is fully inserted into the first tube;

wherein the flow cutouts of the first tube and radiation attenuation insert remain open after being engaged by the spring angle clip such that air or gas can pass through the flow cutouts.

15. The apparatus according to claim 14, wherein the upper securement feature comprises an angled securement flange flared outwards from the one sidewall of the radiation attenuation insert and engaging a top edge of the first tube.

16. The apparatus according to claim 14, wherein the radiation attenuation insert has a height substantially coextensive with the height of the first tube and is supported at its bottom end by the baseplate of the canister.

17. The apparatus according to claim 14, wherein the radiation attenuation insert is formed of a non-ferrous material having a density of at least 7.0 grams/cubic centimeter.

* * * * *